May 22, 1945.  H. B. LATHROP  2,376,604
PREFABRICATING JIG
Filed March 24, 1943  4 Sheets-Sheet 1

Inventor
Harvey B. Lathrop
By Clarence A. O'Brien
and Harvey B. Jacobson
Attorneys May 22, 1945.   H. B. LATHROP   2,376,604
PREFABRICATING JIG
Filed March 24, 1943   4 Sheets-Sheet 2

Inventor
Harvey B. Lathrop
By Clarence A. O'Brien
and Harvey B. Jacobson
Attorneys

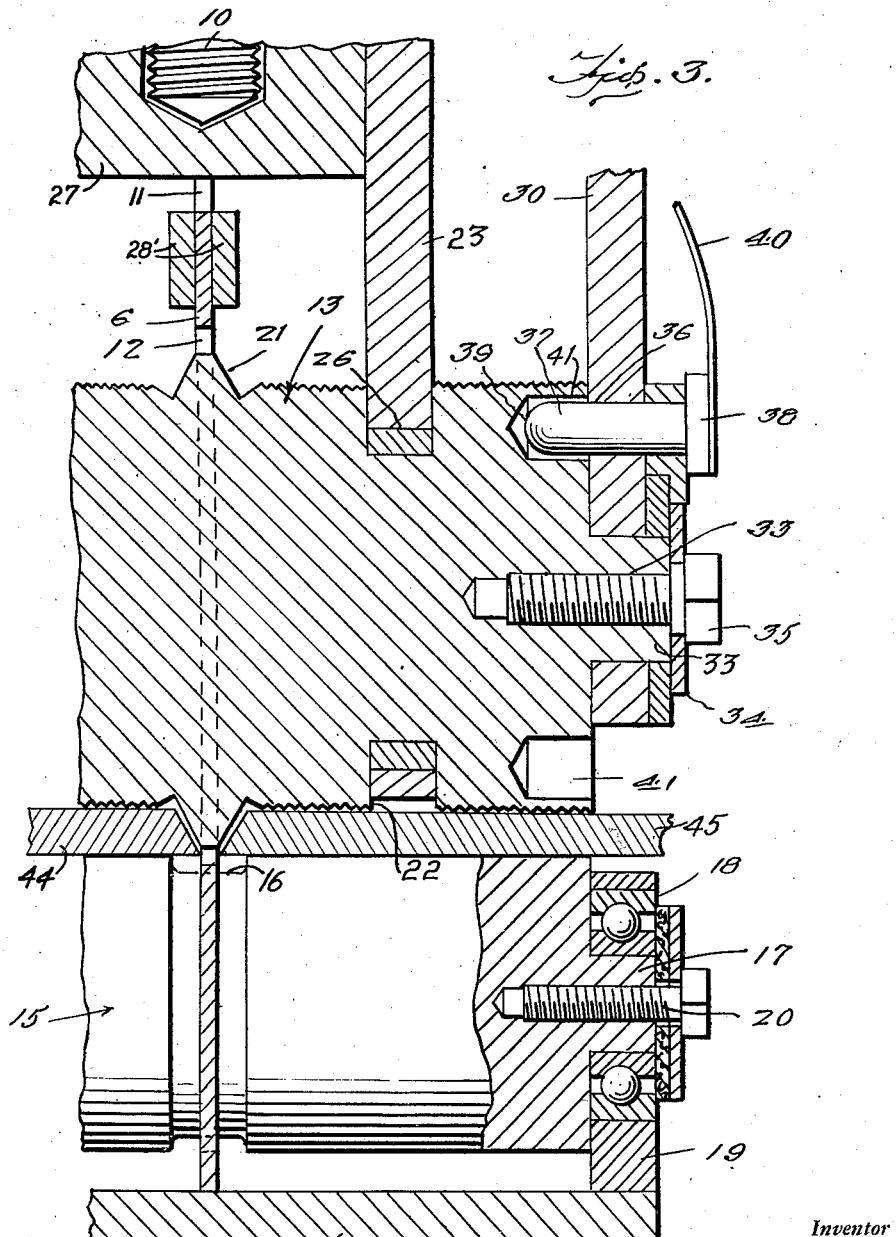

May 22, 1945.  H. B. LATHROP  2,376,604
PREFABRICATING JIG
Filed March 24, 1943  4 Sheets-Sheet 4
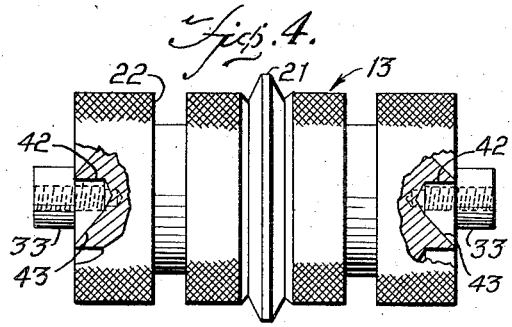
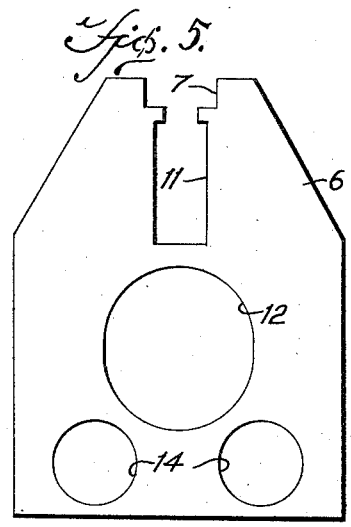 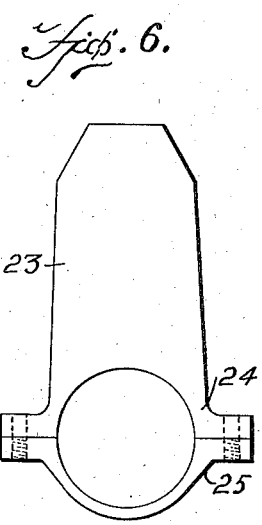 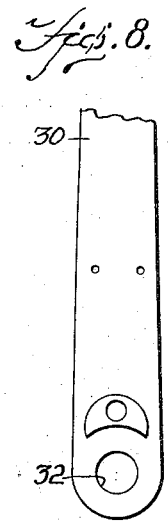
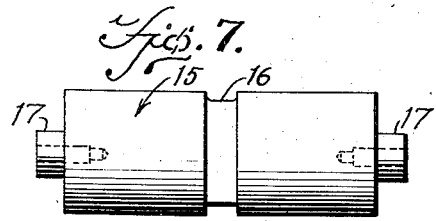 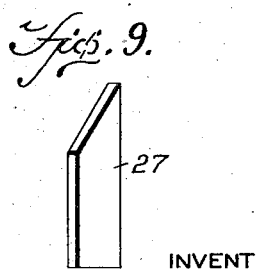
INVENTOR
Harvey B. Lathrop
BY
Clarence A. O'Brien
and Harvey B. Jacobson
ATTORNEYS Patented May 22, 1945

2,376,604

UNITED STATES PATENT OFFICE 2,376,604

PREFABRICATING JIG

Harvey B. Lathrop, St. Cloud, Minn., assignor of twenty-five per cent to Frank C. Lathrop, Moorhead, Minn.

Application March 24, 1943, Serial No. 480,410

2 Claims. (Cl. 113—99)

This invention relates to new and useful improvements in jigs for handling sheet metal and preparing the same for butt welding.

The principal object of the present invention is to provide a device for properly aligning two pieces of sheet metal so that the flat surfaces thereof are held flush and maintained properly spaced while said pieces are being tack-welded together.

An important object of the invention is to provide a jig of the character stated which is especially adapted for use in ship building plants wherever single U-groove, double V-groove, and square groove types of butt joints are utilized.

Other objects and advantages of the invention will become apparent to the reader of the following description.

In the drawings—

Figure 3 is an enlarged detailed sectional view showing the rolls.

Figure 4 is a plan view with portions broken away showing the feed rolls assembled.

Figure 5 is a plan view of the frame plate.

Figure 6 is a side elevational view of one of the standards.

Figure 7 is a plan view of one of the bottom roller assemblies.

Figure 8 is a fragmentary plan view of one of the operating arms.

Figure 9 is a perspective view of one of the guide flanges.

Figure 1:
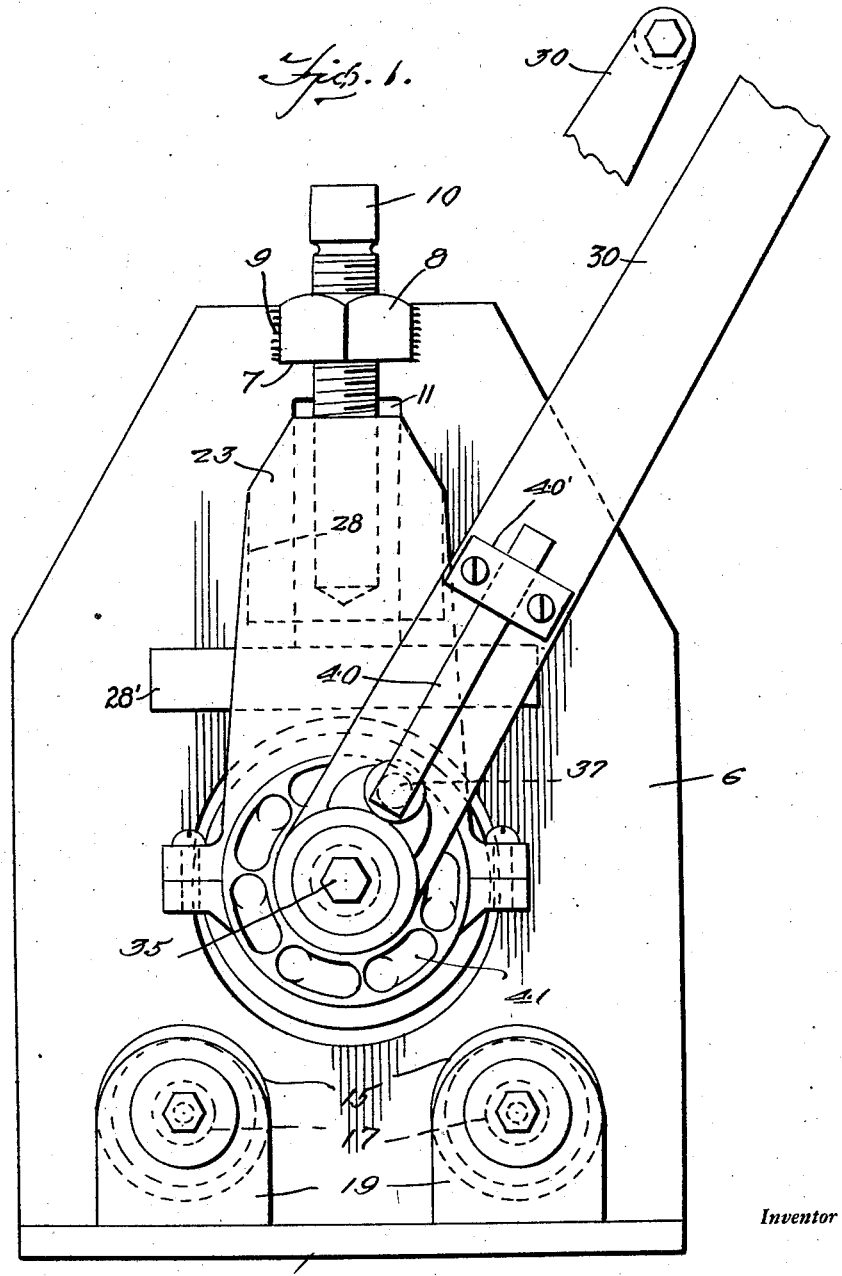
Figure 1 represents a side elevational view of the jig.
Figure 2:
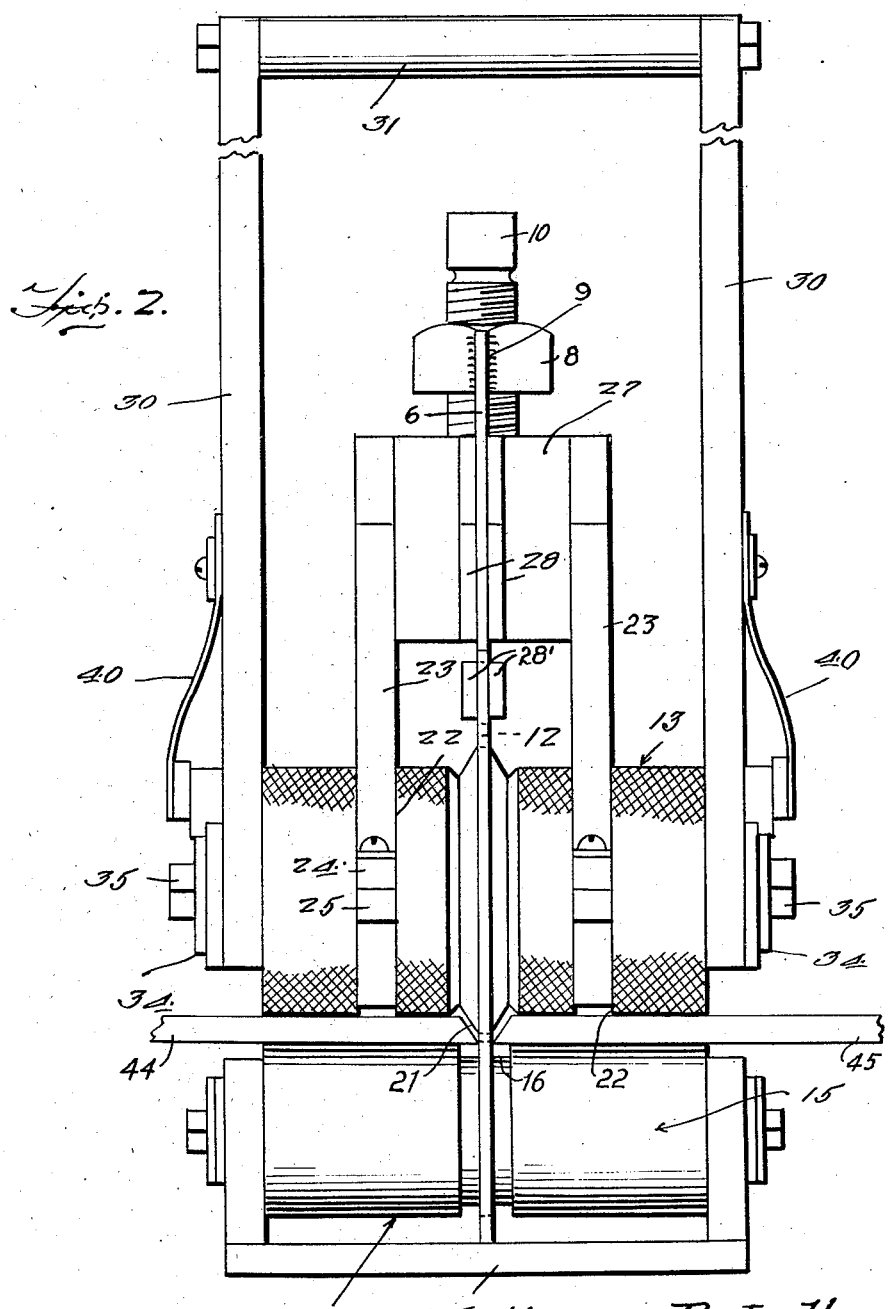
Figure 2 is a front elevational view.

Referring to the drawings wherein like numerals designate like parts, it can be seen that numeral 5 denotes a base plate while numeral 6 denotes a vertical frame plate which is welded at its lower portion to the intermediate portion of the base plate 5 so that it will stand erect as shown in Figures 1 and 3.

The frame plate 6 has a cut-out 7 in its upper portion in which a nut 8 is disposed and welded in place as at 9. Through this nut 8 is disposed an adjusting screw 10.

The screw 10 depends into an elongated rectangular shaped opening 11 in the plate 6. This latter opening terminating over a substantially centrally located circular opening 12 which serves to receive the intermediate portion of the feed roll assembly generally referred to by the numeral 13.

Below the opening 12 and toward opposite side thereof are smaller circular openings 14, 14 for receiving two lower roll assemblies 15, 15.

Each roller assembly 15 consists of an elongated cylindrical structure having a circumferential groove 16 at its intermediate portion, with trunnions 17 at the end of this cylindrical structure disposed into bearings 18 supported as at 19 on the end portions of the base 5. An adjusting screw 20 may be provided for each of the bearings 18.

The feed roll assembly 13 consists of an elongated cylindrical structure having a two-way beveled rib 21 at its intermediate portion, while each half portion of the cylindrical structure beyond the rib 21 is formed with a circumferentially disposed groove 22. As can be seen in Figure 3, the double beveled rib 21 is located within the confines of the large opening 12 of the frame plate 6. Numerals 23 denote standards which are formed with bearing structures 24, 25 at the lower ends thereof, these bearing structures being disposed within the grooves 22 of the feed roll assembly 13 and there is also preferably wear compensating shims or bearing pieces 26 disposed between the said bearings of the standards 23 and the bottoms of the grooves 22.

A slide block 27, an intermediate portion of which is reduced and disposed through the opening 11 in the plate 6 has the upper ends of the standards 23 welded or otherwise secured thereto. Flanges 28 projecting from the block 27 and fixed thereto upon opposite sides of said plate 6 serve to wipe and guide the block 27 with respect to the frame plate 6. Transverse reinforcing bars 28' are provided on said plate 6 below the slide block 27.

Obviously, by adjusting the screw 10, the standards 23, 23 can be raised or lowered without raising or lowering the feed roll assemblies 13 with respect to the bottom roll assemblies 15.

The device has a pair of arms 30, 30 whereby the feed roll assembly 13 is rotated. These arms 30 are connected by a hand bar 31 at their outer ends, while their inner ends are apertured as at 32 for disposition over studs 33 on the ends of the feed roll assembly 13. Retaining means 34 in conjunction with a set screw 35 is provided for forming a bearing and detent means for each arm and as is apparent in Figures 1, 3 and 8, each arm 30 has an opening 36 therein for receiving a slide pin 37 having a stop head 38 at its outer end, while its inner end is rounded as at 39. Each arm 30 has a leaf spring 40, one end of which is anchored as at 40' while its opposite end bears against the head 38 of the corresponding pin 37.

Each end of the feed roll assemblies 13 has a plurality of recesses 41 therein, each having a shoulder 42 and a slanting cam portion 43 for receiving the pin 37. The slide pins 37, recesses 41, shoulders 42, cam portions 43 and springs 40 form ratchet drives between the arms 30 and the ends of the feed roll assembly 13, by means of which said assembly may be rotated step by step by oscillation of said arms 30.

It can be seen that by moving the arms 30 to the left in Figure 1, a substantially 180° rotation of the feed roll assemblies 13 can be obtained, the pins 37 engaging recesses 41 under action of the springs 40 and bearing against the shoulders 42 of said recesses to couple said arms 30 to said assembly 13. By moving the arms 30 back again, the pins 37 of the arms 30 will be cammed out of said recesses 41 by the cam portions 43 of said recesses until the arms are again in a position for said pins to enter other recesses 41 a movement toward the left, the pins 37 will engage behind the shoulders 42 of such other recesses 41 and again couple the arms 30 to the assembly 13.

It will be observed that the frame plate 6 acts as a spacing guide for two sheets 44, 45 of material to be welded interposed between the feed roll assembly 13 and the lower roll assemblies 15 edge to edge and upon opposite sides of said plate.

As the process of fitting the seam progresses, one inch tack-welds are applied in the root area of the seams and are spaced about 8 inches on centers. As each tack-weld cools it contracts, thereby bringing the edges of the two sheets toward each other until both edges of the sheet metal come in contact with the opposite sides of the frame plate 6, hence the root opening of the seams is consistently and accurately maintained slightly less than one-eighth of an inch which is correct spacing for several thicknesses of metal.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A jig comprising a base, a vertical wall rising from the base, work supporting rollers on the base at opposite sides of the wall, a super-structure including a pair of depending legs, the upper portion of said wall supporting the superstructure, said wall having an opening therein above said supporting rollers, a feed roll unit supported by said legs and disposed with its intermediate portion located within said wall opening, a circumferentially disposed work guide rib on said intermediate portion of the feed roll unit and means for rotating the feed roll unit, said legs being vertically slidable on the super-structure and means for holding the legs in a position maintaining the feed roll unit urged snugly against work located on said supporting rolls.

2. A jig comprising a base, a vertical wall rising from the base, work supporting rollers on the base at opposite sides of the wall, a super-structure including a pair of depending legs, the upper portion of said wall supporting the super-structure, said wall having an opening therein above said supporting rollers, a feed roll unit supported by said legs and disposed within its intermediate portion located within said wall opening, a circumferentially disposed work guide rib on said intermediate portion of the feed roll unit and means for rotating the feed roll unit, a handle structure and pawl and ratchet means between said handle structure and said feed roll unit whereby the feed roll unit is rotated.

HARVEY B. LATHROP.